United States Patent [19]

Connell et al.

[11] Patent Number: 4,671,883

[45] Date of Patent: Jun. 9, 1987

[54] FLUID LOSS CONTROL ADDITIVES FOR OIL-BASED WELL-WORKING FLUIDS

[75] Inventors: David L. Connell; Anthony J. Gradwell, both of Leeds, Great Britain

[73] Assignee: Sandoz Ltd., Basel, Switzerland

[21] Appl. No.: 754,536

[22] Filed: Jul. 12, 1985

Related U.S. Application Data

[63] Continuation-in-part of Ser. No. 570,625, Jan. 13, 1984, abandoned.

[30] Foreign Application Priority Data

Jan. 14, 1983 [GB] United Kingdom ............... 8300974
Jun. 27, 1983 [GB] United Kingdom ............... 8317366

[51] Int. Cl.$^4$ ................................. C09K 7/06
[52] U.S. Cl. ................... 252/8.515; 166/282; 166/283; 175/65; 175/72; 252/8.551; 523/130; 526/312
[58] Field of Search ............ 252/8.5 M, 8.55 R; 166/282, 283; 175/65, 72; 523/130; 526/312

[56] References Cited

U.S. PATENT DOCUMENTS

| | | | |
|---|---|---|---|
| 2,969,321 | 1/1961 | Carpenter | 252/8.5 M |
| 3,168,475 | 2/1965 | Jordan et al. | 252/8.5 M |
| 3,207,693 | 9/1965 | Morway et al. | 252/8.55 R |
| 3,351,079 | 11/1967 | Gibson | 166/283 |
| 3,379,650 | 4/1968 | Beasley, Jr. et al. | 252/8.5 M |
| 3,494,865 | 2/1970 | Andrews, Jr. et al. | 252/8.5 M |
| 3,537,525 | 11/1970 | Sarem | 166/283 |
| 3,630,280 | 12/1971 | Fischer et al. | 523/130 |
| 3,738,934 | 6/1973 | Browning et al. | 252/8.5 P |
| 3,775,447 | 11/1973 | Andrews, Jr. et al. | 252/8.55 R |
| 3,956,140 | 5/1976 | Nahm et al. | 252/8.5 C |
| 4,436,636 | 3/1984 | Carnicom | 252/8.5 P |

FOREIGN PATENT DOCUMENTS

| | | |
|---|---|---|
| 49484 | 4/1982 | European Pat. Off. |
| 1058943 | 2/1967 | United Kingdom . |
| 1275619 | 5/1972 | United Kingdom . |
| 2117431A | 10/1983 | United Kingdom . |
| 773049 | 10/1980 | U.S.S.R. |

OTHER PUBLICATIONS

Kurochkin et al., "Prevention of Drilling Mud Loss in Stratal Waters," Neft. Khoz., 1981, (6), 16-19, (CA 95:153237).

*Primary Examiner*—Robert A. Wax
*Attorney, Agent, or Firm*—Gerald D. Sharkin; Richard E. Vila; Thomas C. Doyle

[57] ABSTRACT

Fluid loss control additives for oil-based well-working fluids comprise a solubilized lignite derivative and an oil-swellable or oil-soluble polymer. The solubilized lignite derivative may be oil-solubilized (e.g. a lignite/amine complex) or water-solubilized (e.g. causticized lignite) and may be incorporated in a polymer matrix or added to a dispersion of a polymer in an aqueous medium.

29 Claims, No Drawings

FLUID LOSS CONTROL ADDITIVES FOR OIL-BASED WELL-WORKING FLUIDS

This application is a continuation-in-part of our co-pending application Ser. No. 570 625, filed on Jan. 13, 1984, now abandoned.

This invention relates to improved fluid loss reducing additives for use in oil based well-working fluids.

As described in published European patent application No. 0049484, oil-based drilling fluids, completion fluids and packer fluids (collectively described as "well-working fluids" or "muds") have a number of advantages over aqueous muds in oil drilling operations.

Oil-based well-working fluids can be classified as true oil muds and invert emulsion muds. The former contain only a small amount of water, whereas the latter may contain up to 40% wt. of water as the disperse phase of an invert (water-in-oil) emulsion. Fluid loss reducing additives are added to such muds to minimise loss of the well-working fluid by filtration of the fluid through porous strata.

Many such additives are based upon lignite, either untreated, alkali-treated to isolate the alkali-soluble fraction (humic acid), or treated with amines or other nitrogen-containing organic compounds. Certain polymers may also be used as fluid loss reducing additives.

Lignite may be regarded as 'solubilised' if it has been treated in such a way that it can form a true solution or a stable colloidal dispersion in an aqueous or oil-based liquid medium. For example causticised lignite is solubilised in aqueous media due to formation of sodium humate, while amine-treated lignites are solubilised in oil-based media, particularly when the amines contain long-chain oleophilic hydrocarbon groups.

It has now been found that if a solubilised lignite derivative is intimately mixed with an oil-soluble or oil-swellable polymer, an interaction takes place which enables the intimate mixture to function as a fluid loss control additive more effectively than does either component when used separately, or even than when the two components are added to the same mud without having first been intimately mixed together.

Accordingly, the present invention provides a fluid loss control additive for an oil-based well-working fluid comprising an intimate mixture of (a) a solubilised lignite derivate capable of forming a true solution or a stable colloidal dispersion in an aqueous or oil-based liquid medium and (b) an oil-soluble or oil-swellable polymer.

The intimate mixture may be produced by incorporating the solubilised lignite derivative into a solid matrix of the polymer, or, in the case of water-solubilised lignite, by mixing an aqueous solution or dispersion of the lignite derivative with an aqueous polymer dispersion, before adding to the well-working fluid.

The lignite may be obtained from a variety of sources; preferred lignites have a high humic acid content and show good solubility in sodium hydroxide solution. The solubilised lignite derivative may be causticised, i.e. treated with excess alkali, e.g. sodium or potassium hydroxide solution, preferably in the presence of a wetting agent for example an anionic surfactant, and optionally dried. Preferably the weight of alkali used is from 20% to 33% of the dry weight of lignite. Alternatively the alkali-insoluble fraction may be removed and the humate salt isolated. The particle size of the lignite is preferably below 500 microns.

Alternatively the solubilised lignite derivative may be the product of reacting untreated lignite, causticised lignite, humic acid or a humic acid salt with an oleophilic amine, amine salt, quaternary ammonium salt, amide, amide-amine or nitrogen-containing heterocyclic compound, particularly one having at least one long chain ($C_{12-22}$)alkyl or alkenyl group in its molecule. Suitable derivatives include amine-treated lignites prepared as described in U.S. Pat. Nos. 3,168,475 or 3,281,458, or a lignite treated with a long-chain fatty acyl partial amide of a polyalkylene polyamine as described in U.S. Pat. Nos. 3,494,865, 3,671,427 or 3,775,447.

Further solubilised lignite derivatives are described in European patent application No. 0049484 and in British patent application No. 2 117 431 A. Preferred are the derivatives obtained by treating lignite with amide-amines and amides obtainable by partial or complete reaction of a linear di- or polyamine of formula

  I in which
R is H, $C_{2-6}$hydroxyalkyl, $C_{1-22}$alkyl or $C_{2-22}$alkenyl, preferably containing a straight chain of from 12- to 22 carbon atoms,
n is 2 or 3 and
x is 0 or 1-5
with up to (x+2) moles of a linear fatty acid such as stearic, oleic, linoleic or palmitic acid or mixtures of these and other acids, for example crude oleic acid derived from tallow or from crude or distilled tall oil. Amine groups in I which are not converted to amide are preferably converted to the salt form by reaction with the same or a different acid. Cyclised products such as imidazoles and their salts are also included in this preferred group of amine derivatives.

An addition complex of lignite with the amine (or amine derivative) is formed when lignite is contacted with amine in a polar or oily medium, or directly. The addition complex will tend to have predominantly ionic bonding between the lignite and amine components, but there may also be covalent bonding, the extent of which will depend upon factors such as the temperature of reaction and the nature of the medium in which the components were mixed Covalent bonds may also be formed during processing in hot polymer melts. For simplicity, however, the term "amine/lignite complex" will be used herein to mean addition complexes or covalently bonded compounds of lignite with amines or with any of the amine derivatives listed above.

The proportion of amine to lignite in the products of the invention may vary between wide limits. Typical proportions are in the range of 1:2 to 2:1 lignite:amine by weight, preferably approximately 1:1.

According to a first aspect of the invention, a solubilised lignite derivative, which is preferably oil-solubilised amine/lignite complex, is dispersed in a matrix of an oil-soluble polymer.

The polymer in which the amine/lignite complex is dispersed may be either thermoplastic or thermosetting, provided that it is soluble in liquid hydrocarbons, particularly diesel fuel and crude oil. Suitable types of polymer include phenol/formaldehyde resins; polyamides; polyesters; resin polyesters; urea/formaldehyde resins; melamine/formaldehyde resins; vinyl polymers, particularly polyacrylic esters; natural polymers, e.g. bitumen; and modified natural materials, e.g. oxidised asphalt and oxidised waxes. Preferred polymers are thermoplastic phenol/formaldehyde resins of the 'Novolak' type, e.g. from nonylphenol/formaldehyde polymerised under acid conditions. Mixtures of different polymer types may also be used.

The polymer should preferably be brittle and easily crushed when solid, at least when containing the amine/lignite complex, and should be capable of being processed at a temperature below 200° C., and have a low viscosity at the processing temperature. The polymer should not give adverse effects when incorporated into oil-based and invert emulsion muds, and preferably should actually give desirable properties, e.g. by improving emulsion stability, giving desirable rheology or having intrinsic fluid loss control properties.

A polymer containing amine groups or derivatives thereof such as amine salt or quaternary ammonium groups may be capable of acting simultaneously as the amine of the amine/lignite complex and as the polymer matrix, and it may not be necessary to form an amine/lignite complex with a different, non-polymeric, amine. The product obtained by dispersing lignite or humic acid in such a polymer is also within the scope of the present invention. Suitable polymers include for example copolymers of acrylic esters with smaller amounts of monomers of formula V

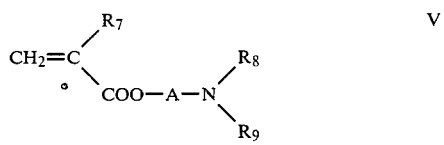

in which
$R_7$ is H or methyl
$R_8$ is H or $C_{1-6}$alkyl
$R_9$ is $C_{1-6}$alkyl or $R_8$ and $R_9$ together with the nitrogen atom to which they are attached form a heterocyclic 5- or 6-membered ring which may contain an oxygen or a further nitrogen atom, and
A is a straight or branched chain $C_{2-6}$alkylene group.

A preferred polymer of this type is a copolymer of isobutyl methacrylate with dimethylaminoethyl methacrylate.

Other amine-group containing polymers include phenol/amine/formaldehyde resins, for example novolak resins crosslinked with melamine or hexamine.

The weight ratio of polymer to amine/lignite complex may vary over a wide range, governed by the properties of both polymer and complex, but typically lies between 1:9 and 9:1, preferably between 1:4 and 3:7. The same ratios are preferred for the ratio polymer: lignite when the polymer contains amine groups and no additional amine is used.

The fluid loss reducing additives of this aspect of the invention may be prepared in one or another of three ways:

(a) The amine/lignite complex is formed in the absence of the polymer, preferably in a liquid medium, and the complex is added to the molten polymer or prepolymer.

(b) The amine/lignite complex is formed in situ by adding lignite and a suitable amine directly to the molten thermoplastic polymer.

(c) The amine/lignite complex is formed in suspension in monomer or prepolymer and the mass is then polymerised or crosslinked to form the polymer.

In each case, the lignite or amine/lignite complex is well dispersed in the polymer by stirring or other means, and the resulting mixture is cooled until hard, then crushed or ground into a fine powder.

In process (a) the amine and lignite may be blended together e.g. in a pug mill, in the absence of any additional liquid, and then added to the molten polymer. Preferably, however, a liquid medium is used, which is preferably a polar liquid in which the amine is soluble. The lignite is suspended in the liquid, the amine is added and the mixture is stirred. Optionally, heat or milling may be used to aid the reaction. In a polar medium, the amine/lignite complex may sediment out from suspension, excess liquid may be removed by decantation or filtration, and the complex obtained in the form of a slurry, filter residue or presscake. It is important that the complex is not dried, but is added in the damp state to liquid polymer at a temperature such that the excess liquid medium boils off, or at least may be removed under vacuum.

The liquid medium used in the formation of the complex is preferably one which facilitates reaction of the lignite and amine, which is a poor solvent for the amine/lignite complex, which is volatile at the processing temperature of the polymer, and which does not react adversely with the amine, lignite, the amine/lignite complex or with the polymer used. Preferred liquids are lower alcohols and water, especially methanol and water, particularly methanol.

The liquid polymer may be a molten thermoplastic resin or a prepolymer of a thermosetting resin before the final curing step. The complex may be incorporated into the liquid polymer by stirring, and the mixture solidified by cooling or by completing the curing step. The cooled product is then crushed or ground to a powder and is ready for use.

Alternatively, the complex may be incorporated into a thermoplastic polymer in processing equipment such as a roll mill, 2-blade mixer, pug mill or extruder, the temperature being below the melting point, but above the softening point, of the polymer.

In process (b), the lignite is incorporated into molten thermoplastic polymer, and a suitable amine is added before, during or after the incorporation of lignite. The amine used in this process variant must be of high boiling point so that it is not lost by evaporation before it can react with the lignite.

In process (c) the lignite and amine are added to liquid monomer and polymerisation is carried out in conventional manner. Alternatively, lignite and amine are added to liquid prepolymer and curing is then completed. Clearly in this variant the presence of the amine must not interfere with the polymerisation or curing process.

When the amine of the amine/lignite complex forms part of the polymer, process (a) cannot be used, but processes analogous to (b) or (c) are suitable. Lignite alone is added either to a melt of the aminopolymer, or to the monomer, mixture of monomers or prepolymer which will form the aminopolymer.

The product may be mixed with fillers, e.g. attapulgite clay, flow aids, dispersants or other additives to provide suitable physical properties, particularly to enable the product to be ground to a hard, non-sticky powder. Such additives may be added to the molten mass or after grinding.

The products of this aspect of the invention have excellent fluid loss control properties when added to oil-based well working fluids at a concentration of from 1–20 ppb (pounds per barrel), and may, by suitable choice of resin type, avoid problems associated with certain prior art products, such as their adverse interaction with certain quaternary amines used in the manufacture of oleophilic clay viscosifiers. Being solids, the products take up less storage and packing room, have lower transporation costs and can be more convenient to handle in certain situations.

According to a further aspect of the invention, an aqueous solution or dispersion of a water-solubilised lignite derivative is mixed with a dispersion of an oil-soluble or oil-swellable polymer in an aqueous medium.

The water-solubilised lignite derivative is preferably a causticised lignite or a humate salt, more preferably causticised lignite. The causticised lignite is preferably prepared by suspending lignite in water with a small quantity of a wetting agent, preferably an anionic surfactant, and stirring until it is thoroughly wetted, then adding about 20% dry weight (based on dry weight of lignite) of sodium hydroxide in the form of a strong aqueous solution and stirring until a smooth solution is obtained, having a pH preferably $\geq 11.4$. Preferably about 5% wt. potassium hydroxide is then added to the solution. The resulting solution should preferably have a lignite content of from 8% to 30% solids.

The polymer may be any oil-soluble or oil-swellable polymer, which may be internally cross-linked to reduce the degree of swelling in oil. The polymers are preferably copolymers of two or more monomers, for example styrene/butadiene, ABS or mixed acrylate polymers, or PVC plasticised by graft copolymerisation with nitrile polymers. The polymers preferably have a molecular weight, before any cross-linking step, of from 500,000 up to the limit preparable by the polymerisation process used in their preparation.

The polymers are preferably prepared as aqueous suspensions by an emulsion polymerisation process. They may optionally be further modified by addition of hydrophilic groups, e.g. by carboxylation, or by addition of reactive sites, e.g. by the use of commonomers such as N-methylolacrylamide.

It is preferred that the polymers are in the form of a stable dispersion or latex in an aqueous medium. Such latices usually contain up to 50% wt. of polymer, and are generally stabilised by the addition of an anionic surfactant for example the salt of a long chain fatty acid, such as sodium or potassium oleate. When such a latex is to be mixed with a solution containing a high electrolyte level, such as causticised lignite, it is advisable to add additional surfactant to prevent precipitation of the polymer.

The lignite derivative and polymer are mixed in an aqueous medium which may be water or a mixture containing at least 70% by wt. water and up to 30% wt. of a liquid hydrocarbon. Other liquids, e.g. higher alcohols and/or ethylene glycol, may be added to assist in blending the water and hydrocarbon, or to provide low temperature stability. Suitable liquid hydrocarbons include mineral oil fractions, for example diesel oil, and crude aromatic solvents, for example mixed methyl naphthalenes.

Preferred mixtures contain from 5 to 26% by weight of lignite derivative and from 2 to 30% by weight of polymer (based on the total weight of the mixture and on the dry weight of active components). The weight ratio of lignite derivative to polymer is preferably from 1:3 to 3:1, more preferably from 1:1 to 1:2, particularly about 1:1.5.

The order of addition is not critical, but it is preferred to add the lignite derivative to the polymer latex, rather than the latex to the lignite. The mixture is then stirred together, preferably at room temperature, until homogenous. Optionally, further additives may be present, for example emulsifiers, e.g. alkali metal oleates or non-ionic surfactants; gelling agents; and low temperature stabilisers, e.g. ethylene glycol.

The product may be added to an oil-based mud in a concentration of preferably from 1 to 10 pounds per barrel (approx. 2.8 to 28 g/l), more preferably 2–5 p.p.b.

It is particularly surprising that a composition containing a water-solubilised lignite derivative and prepared in an aqueous medium, is highly effective as a fluid loss control agent in an oil-based mud.

The following Examples in which all parts are by weight illustrate the invention.

EXAMPLE 1

(a) 800 Parts of nonylphenol, 98.2 part of paraformaldehyde and 10.9 parts of oxalic acid are charged into a reactor equipped for heating, stirring, reflux, distillation and vacuum. The reactor contents are heated under reflux to 100° C. and held for 4 hours until the refractive index of the vessel contents have reached a maximum. After this time the reactor is converted for distillation and the pressure in the reactor reduced to 100 torr over 1 hour. At the same time the temperature of the vessel contents is allowed to rise to 130° C. During this time about 58 parts of water are collected in the receiver. The vessel is then discharged to yield 851 parts of nonylphenol-formaldehyde resin.

(b) 76 Parts of a monoamide derived from tall oil fatty acid and diethylenetriamine, 78 parts of lignite and 136 parts of methanol are mixed with high shear for 45 minutes. After this time the mixture is allowed to stand whereby the methanol separates from the reaction product. This product is then added with stirring to 300 parts of nonylphenol-formaldehyde resin, produced as in (a) at 130° C. The mixture is stirred for a further 45 minutes, after which the molten mass is discharged, cooled and ground to a powder.

(c) The product of Example 1(b) is added at a concentration of 4 ppb to 350 ml of diesel fuel in a stainless steel cup and stirred vigorously on a high speed stirrer (Hamilton Beach or similar type) for 30 minutes. The suspension is then poured into a standard API fluid loss cell and the fluid loss over 30 minutes at 100 psi pressure measured. Good results are obtained.

EXAMPLE 2

EXAMPLE 1 is repeated using, in (a) 749 parts of isooctylphenol in place of 800 parts nonylphenol, 800 parts of resin being obtained. Similar good results are obtained.

EXAMPLE 3

A copolymer of 97% wt. isobutyl methacrylate and 3% wt. dimethylaminoethyl methacrylate is prepared as described under "Copolymer 1" in U.S. Pat. No. 4,325,862. The copolymer (100 parts) is melted by heating to a temperature above 120°, and 20 parts of lignite are mixed thoroughly into the molten polymer.

The mixture is cooled, ground to a powder and used as a fluid loss control additive in an invert mud.

EXAMPLE 4

(a) Preparation of causticised lignite 12.9 Parts of lignite (containing 16% wt. moisture) are dispersed in 34 parts water containing 0.2 parts wetting agent, using a high speed mixer. 6.3 Parts of 30% aqueous caustic soda solution are added, and stirring is continued for 30 minutes. Finally 1.5 parts of 50% aqueous KOH solution is added and stirred for 1 minute, to adjust the final pH to 11-12.

(b) Preparation of fluid loss control additive

The solution prepared in a) is added to 40 parts of a 50% aqueous emulsion of a styrene/butadiene copolymer emulsion having a Brookfield viscosity of 125, a pH of 7, a polymer glass transition temperature (TG) of $-55°$ and containing a synthetic anionic surfactant as dispersing agent (Type 741, Polysar Ltd.). After 3 minutes stirring, 4 parts crude aromatic high boiling solvent (methylnaphthalenes) and 2 parts ethylene glycol are added, and the mixture stirred until homogenous.

The product, when incorporated at 4 ppb in an invert mud containing 90% diesel oil, 10% water and viscosified with oleophilic clay for acceptable rheology gave results in the HTHP (high temperature high pressure) test at 93° C., 500 psi which were superior to either the polymer component alone or the lignite component alone at the same concentrations.

EXAMPLES 5-13

Polymer emulsions of Polysar Ltd. having the properties shown in Table I are used in place of the copolymer of Example 4 together with causticised lignite. Similar good results are obtained.

EXAMPLE 14

(a) Preparation of causticised lignite

To a solution of 0.8 parts sulphonated isopropyl oleate in 335.7 parts water is added gradually 104.4 parts lignite, with stirring. The mixture is stirred for 15-30 minutes until the lignite is thoroughly wetted and the liquid appears black and glossy. To the mixture is added 73.9 parts 30% aqueous caustic soda solution, and the mixture is warmed to 50° and stirred to give a smooth, viscous solution of pH $\geq 11.4$. To this is added 10 parts 50% aqueous potassium hydroxide solution, and the mixture is stirred while cooling at 20°-25°.

(b) Preparation of fluid loss control additive

To 390.9 parts of Polymer latex 741 (see Example 4) is added 24.6 parts crude 25% potassium oleate solution, obtained by neutralisation of tall oil fatty acid with KOH. The product is added slowly to the stirred product of (a), and the mixture stirred for 30 minutes. At this point 20 parts ethylene glycol and 40 parts aromatic hydrocarbon column bottoms are added, and stirring is continued for 1-2 hours. The product contains 10.4% lignite and 16.4% polymer by weight.

It gives similar results to those from the product of Example 4.

We claim:

1. A fluid loss control additive for an oil-based well-working fluid comprising an oil-solubilized amine/lignite complex dispersed in a solid matrix of an oil-soluble polymer, said amine/lignite complex being a derivative formed by reacting untreated lignite, causticized lignite, humic acid or a humic acid salt with an oleophilic compound containing at least one $C_{12-22}$ alkyl or alkenyl group and selected from the group consisting of amines, amine salts, quaternary ammonium salts, amides, amide-amines and nitrogen-containing heterocyclic compounds.

2. A fluid loss control additive according to claim 1 in which the oil-solubilised lignite derivative is obtained by treating lignite with an amide-amine or amide obtainable by partial or complete reaction of a linear di- or polyamine of formula

in which

R is H, $C_{2-6}$hydroxyalkyl, $C_{1-22}$alkyl or $C_{2-22}$alkenyl, n is 2 or 3 and

TABLE I

| Ex. No. | Code No. | Polymer properties Chemical type | TG °C. | Emulsion properties total solids % | pH | Brookfield viscosity | Emulsifier type |
|---|---|---|---|---|---|---|---|
| 5 | 2600 X146 | acrylic co-polymer | −40 | 42 | 11 | 30 | K oleate |
| 6 | 2671 H 49 | carboxy-modified acrylic ester (heat reactive) | −11 | 49.5 | 3.3 | 35 | SA* |
| 7 | 552 H151 | PVC externally plasticised with non-migrating Hycar rubber | +3 | 56 | 10 | 100 | SA |
| 8 | 2600 H157 | pressure sensitive tacky acrylic | −39 | 49.5 | 2.5 | 100 | SA |
| 9 | 1561 H 1 | high acrylonitrile ABS | −16 | 42 | 10.3 | 60 | FA+ |
| 10 | 1577 | medium acrylonitrile ABS | +22 | 43 | 10 | 30 | FA |
| 11 | 2600 X222 | v.low MW acrylic latex | −10 | 51.5 | 5 | 110 | SA |
| 12 | 2570 X5 | carboxy modified SB latex | +15 | 41 | 6.5 | 20 | SA |
| 13 | 2600 X104 | carboxy-modified acrylic (heat reactive) | −15 | 51 | 6.5 | 70 | SA |

*SA = synthetic anionic
FA = fatty acid x is 0 or 1-5
with up to (x+2) moles of a linear fatty acid; or with a salt or cyclized derivative of said amide-amine or amide.

3. A fluid loss control additive according to claim 2 wherein, in formula I, R contains a straight chain of 12 to 22 carbon atoms and the linear fatty acid is selected from the group consisting of stearic, oleic, linoleic and palmitic acids and mixtures thereof with other acids.

4. A fluid loss control additive according to claim 2 wherein the polymer is selected from the group consisting of phenol/formaldehyde resins, polyamides, polyesters, resin polyesters, urea/formaldehyde resins, melamine/formaldehyde resins, vinyl polymers, bitumen, oxidized asphalt and oxidized waxes.

5. A fluid loss control additive according to claim 2 wherein the polymer is a thermoplastic phenol/formaldehyde novolac resin.

6. A fluid loss control additive according to claim 1 in which the polymer is a thermoplastic phenol/formaldehyde novolak resin.

7. A fluid loss control additive according to claim 1 in which the polymer is a copolymer of an acrylic ester with a smaller amount of a monomer of formula V

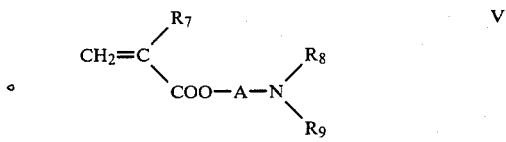

in which
R$_7$ is H or methyl
R$_8$ is H or C$_{1-6}$alkyl
R$_9$ is C$_{1-6}$alkyl or R$_8$ and R$_9$ together with the nitrogen atom to which they are attached from a heterocyclic 5- or 6-membered ring which may contain an oxygen or a further nitrogen atom, and
A is a straight or branched chain C$_{2-6}$alkylene group.

8. A fluid loss control additive according to claim 1 wherein the proportion of amine, amine salt, quaternary ammonium salt, amide, amide-amine or nitrogen-containing heterocyclic compound to lignite is in the range of 1:2 to 2:1 by weight.

9. A fluid loss control additive according to claim 8 wherein the polymer is selected from the group consisting of phenol/formaldehyde resins, polyamides, polyesters, resin polyesters, urea/formaldehyde resins, melamine/formaldehyde resins, vinyl polymers, bitumen, oxidized asphalt and oxidized waxes.

10. A fluid loss control additive according to claim 9 wherein the weight ratio of polymer to amine/lignite complex is in the range 1:4 to 3:7.

11. A fluid loss control additive according to claim 1 wherein the polymer is selected from the group consisting of phenol/formaldehyde resins, polyamides, polyesters, resin polyesters, urea/formaldehyde resins, melamine/formaldehyde resins, vinyl polymers, bitumen, oxidized asphalt and oxidized waxes.

12. A fluid loss control additive according to claim 11 wherein the weight ratio of polymer to amine/lignite complex is in the range 1:9 to 9:1.

13. A fluid loss control additive for an oil-based well-working fluid comprising an intimate mixture of dissolved or dispersed water-solubilized causticized lignite and a dispersed oil-soluble or oil-swellable polymer in an aqueous medium.

14. A fluid loss control additive according to claim 13 wherein the weight ratio of causticized lignite to polymer is in the range 1:3 to 3:1.

15. A fluid loss control additive according to claim 14 in which the polymer has a molecular weight of at least 500,000.

16. A fluid loss control additive according to claim 15 in which the aqueous medium is water or a mixture of water and liquid hydrocarbons containing at least 70% water and up to 30% liquid hydrocarbons, by weight.

17. A fluid loss control additive according to claim 16 containing 5-26% dry weight of lignite derivative and 2-30% dry weight of polymer.

18. A fluid loss control additive according to claim 13 in which the polymer is a copolymer of two or more monomers.

19. A fluid loss control additive according to claim 18 in which the polymer is selected from styrene/butadiene, ABS, mixed acrylate polymers, PVC plasticised by graft copolymerisation with nitrile polymers, and such polymers modified by carboxylation or by addition of reactive sites.

20. A fluid loss control additive according to claim 19 in which the polymer is in the form of a stable dispersion or latex stabilized with an anionic surfactant.

21. A fluid loss control additive according to claim 20 in which the aqueous medium is water or a mixture of water and liquid hydrocarbons containing at least 70% water and up to 30% liquid hydrocarbons, by weight.

22. A fluid loss control additive according to claim 21 containing 5-26% dry weight of lignite derivative and 2-30% dry weight of polymer.

23. A fluid loss control additive according to claim 18 in which the polymer is in the form of a stable dispersion or latex, stabilised by the addition of an anionic surfactant.

24. A fluid loss control additive according to claim 13 in which the aqueous medium is water or a mixture of water and liquid hydrocarbons containing at least 70% wt. water and up to 30% wt. of liquid hydrocarbons.

25. A fluid loss control additive according to claim 13 containing 5-26% dry weight of lignite derivative and 2-30% dry weight of polymer.

26. A fluid loss control additive according to claim 25 in which the dry weight ratio of lignite derivative to polymer is between 1:1 and 1:2.

27. An oil-based well-working fluid containing from 1 to 10 pounds per barrel of a fluid loss control additive according to claim 1.

28. An oil-based well-working fluid containing from 1 to 10 pounds per barrel of a fluid loss control additive according to claim 13.

29. An oil-based well-working fluid containing from 1 to 10 pounds per barrel of a fluid loss control additive according to claim 17.

* * * * *